Dec. 17, 1935.  H. E. ELROD  2,024,345
SEWAGE PURIFYING DEVICE
Filed May 4, 1932  3 Sheets-Sheet 1
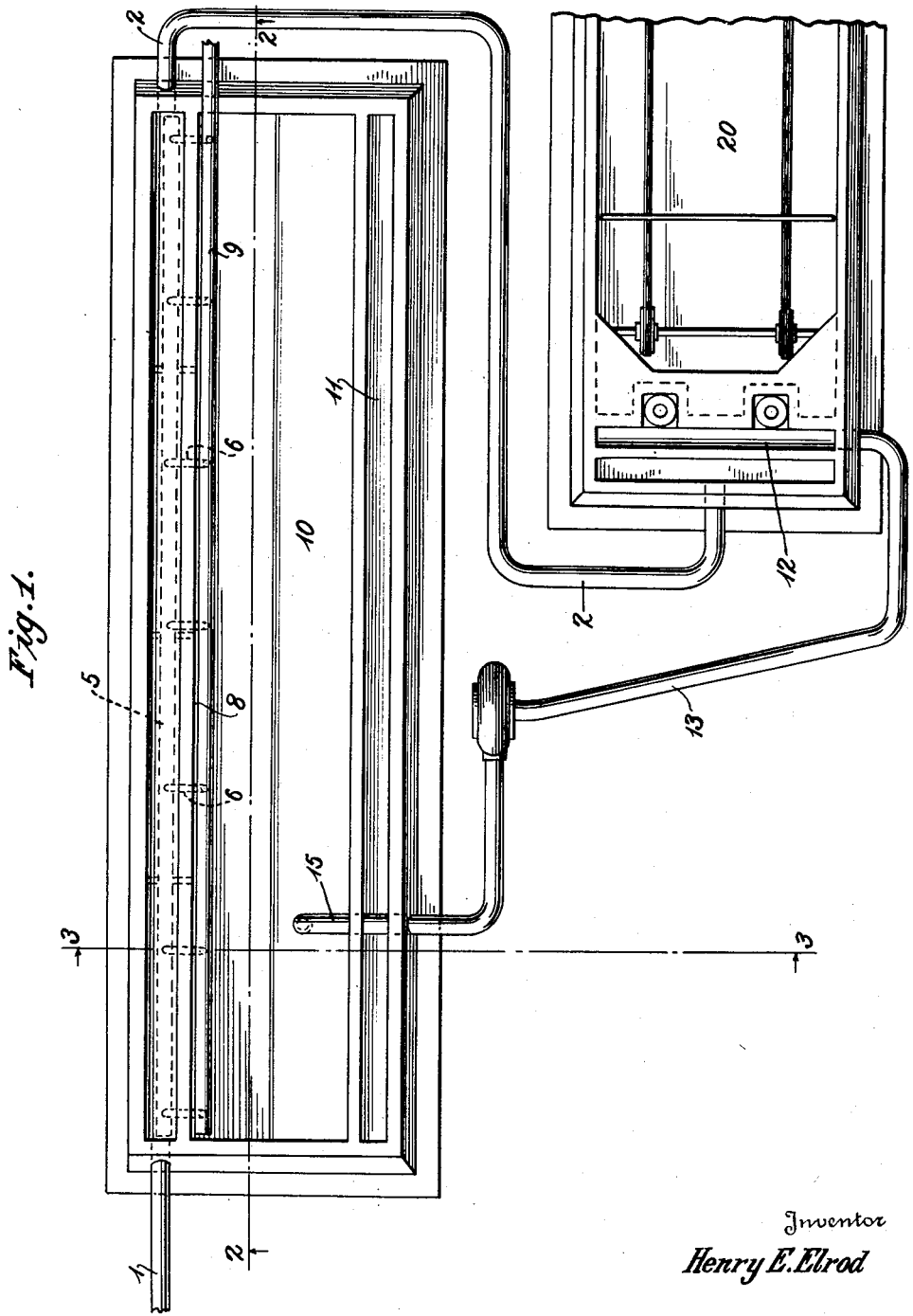
Inventor
Henry E. Elrod
By Knight Bros
Attorneys

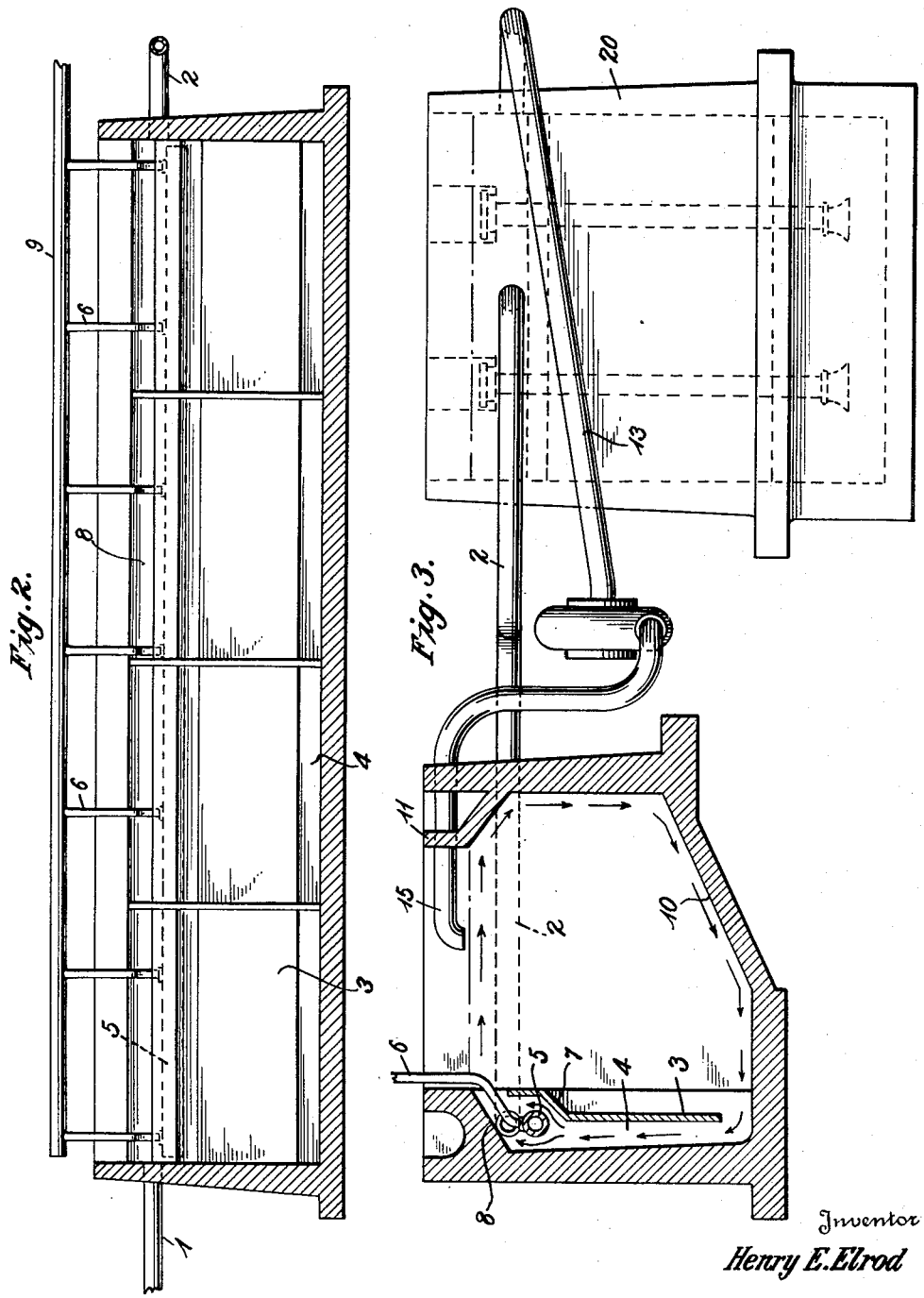

Dec. 17, 1935.  H. E. ELROD  2,024,345
SEWAGE PURIFYING DEVICE
Filed May 4, 1932  3 Sheets-Sheet 3
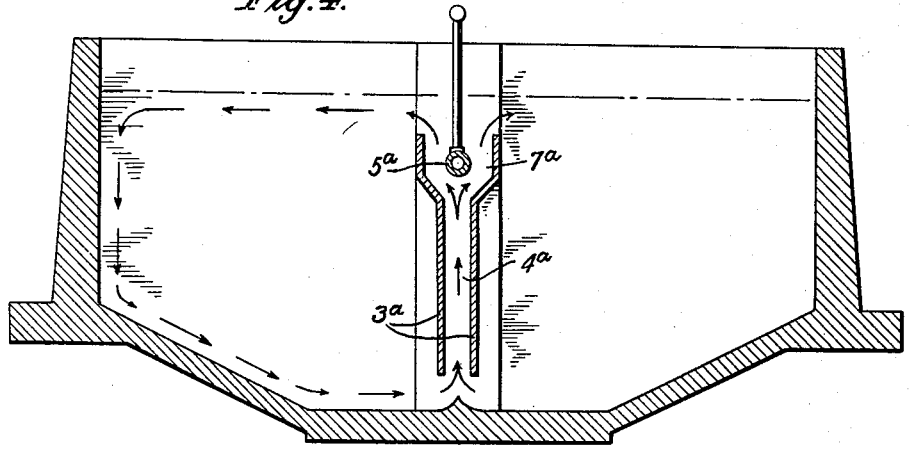
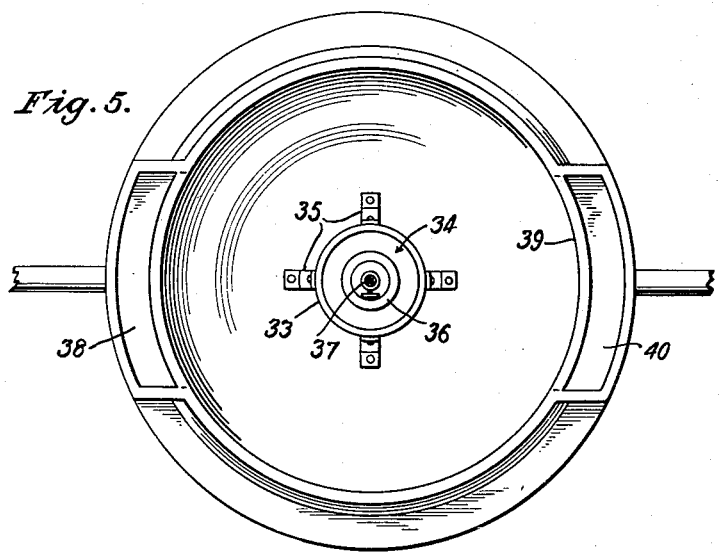
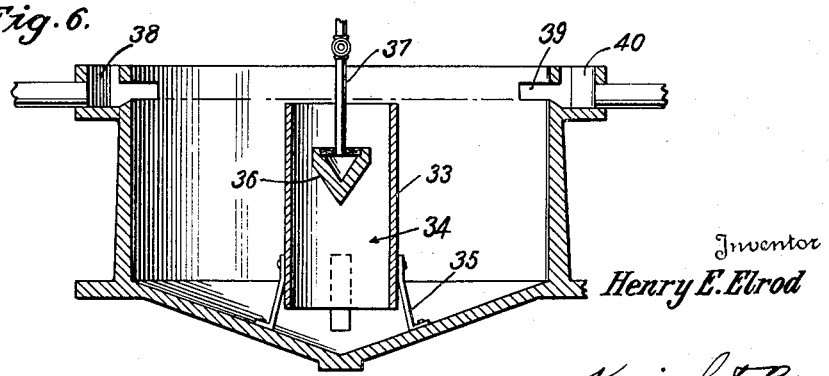
Inventor
Henry E. Elrod Patented Dec. 17, 1935

2,024,345

UNITED STATES PATENT OFFICE 2,024,345

SEWAGE PURIFYING DEVICE

Henry E. Elrod, Houston, Tex.

Application May 4, 1932, Serial No. 609,314

8 Claims. (Cl. 210—8)

This invention relates to apparatus for puifying water containing organic impurities, such as city sewage, and has for its primary object to greatly reduce the cost of operation of the so called "activated sludge" process, frequently used for this purpose.

In the conventional Manchester chamber, in which the activated sludge process is carried out, the impure water is caused to circulate to keep the aerobic bacteria constantly coming to the surface to renew their supply of oxygen, which is essential to their activity. The circulation is effected by introducing air into the liquor at the bottom of the tank and usually near one side.

The whole body of sewage in the tank must be kept in active circulation to constantly return the sludge to the surface to replenish the supply of oxygen of the aerobic bacteria. There must be no accumulation of settled solids in any part of the tank, for such deposits would soon putrify and destroy the activated sludge. Therefore it has always been the practice to introduce the air at or near the bottom of the tank to keep the current sweeping over the floor and carrying all settling sludge back into circulation. The power required for blowing air into the liquor at the full depth of the tank is so considerable that it has frequently deterred cities from utilizing this highly effective method of purifying their sewage.

In accordance with my invention this power requirement is greatly reduced by mounting the air diffusors relatively high in the tank, preferably near the surface of the sewage, and arranging baffles or pipes in such a relation to the diffusors that a current is set up by the air which extends to all parts of the tank, down to the very bottom, and maintains the whole body of sewage in active circulation. The baffles or pipes extend from just below the surface of the sewage very nearly to the bottom of the tank and thereby, without interfering with the circulation of the sewage, direct the circulation so that it extends throughout the whole tank.

The conventional aeration chamber is 15 feet deep. To introduce air into the bottom of such a chamber requires a pressure of 6.51 pounds per square inch, plus enough more to overcome friction losses. I am able to obtain excellent results with the diffusors submerged 3 feet, for which depth a pressure of only 1.302 pounds per square inch, plus the same amount as above for friction losses, is sufficient. Since the power requirements are nearly proportionate to the pressure, it is readily seen that only a fraction of the power is required for the shallow depth, as against the greater depth.

Several forms of apparatus illustrating my invention are shown in the drawings and will be described hereinafter.

In the drawings,

Fig. 1 is a plan view of one form of aeration chamber embodying my invention, showing also part of a final settling tank and sludge returning means, Fig. 2 is a vertical section on line 2—2 of Fig. 1, Fig. 3 is a transverse section on the line 3—3 of Fig. 1, Fig. 4 is a transverse section of a double aeration chamber with the diffusors and upflow channel in the middle, Fig. 5 is a plan view of a circular tank arranged according to my invention, and Fig. 6 is a central vertical section of the tank shown in Fig. 5.

In Figs. 1 to 3 an aeration tank is shown having an influent channel 1 and an effluent channel 2. At the left side of the tank is a substantially vertical baffle 3 running the full length of the tank and forming a narrow vertical channel 4 at one side of the tank. Air diffusors 5 are suspended on air pipes 6 so that they are stationed in the upper end of the channel 4 near the surface of the liquor. The channel 4 may be flared at 7 to avoid a reduction of its cross-section which would be caused by the obstruction of the diffusor 5, if the channel were of uniform width. Above the channel 4 is a deflector 8, the purpose of which is to turn the flow to a horizontal direction as it approaches the surface. The pipes 6 are supplied with air from a header 9. The effluent channel 2 delivers the aerated sewage into a final settling tank 20 where the sludge which is carried out of the aeration tank settles out. The sludge is raised into a trough 12 and from there is returned through a pipe 13 back to the aeration chamber at 15. The sewage in the aeration chamber is thus reinoculated as desired. The return of the sludge to the aeration tank preferably takes place at some distance from the influent end of the tank, as shown, to provide a period of pre-aeration for the sewage coming into the tank. Good results are obtained in this way where the sewage is septic or contains other material toxic to the bacteria composing the activated sludge. The period of pre-aeration frees the sewage from toxic gases and reduces the biological oxygen demand.

Assuming the tank to have been filled to the level indicated, by sewage flowing in through the influent channel 1, air is blown through diffusors 5, which rises toward the surface, setting in motion the surrounding liquor. The air bearing liquor flows to the upper end of channel 4, where it strikes deflector 8 and its flow is turned toward the horizontal. As it passes out from under the deflector 8, most of the air is released into the atmosphere, the liquor continuing in a current across the surface toward the opposite side of the tank. Near the opposite side it strikes a downwardly inclined deflector 11 which turns the flow downward along the opposite side. The current then strikes the sloping portion 10, of the bottom, and is turned back toward the channel side of the tank. As the current sweeps across the bottom it carries with it any sludge tending to settle to the floor and brings it to the foot of the channel 4. Here the current is turned again and passes up through the channel 4, by reason of the pumping action of the air introduced into the upper end of the channel. The sludge drawn up from the bottom of the tank is immediately exposed to the atmosphere when it reaches the surface and flows across the surface with the current. The current around the walls of the tank indicated by the arrows in Fig. 3 sets in motion the rest of the sewage in the tank, so that the whole body of sewage is kept in active circulation.

Fig. 4 shows the use of a double chamber with the upflow channel 4a located in the middle. The channel 4a is formed by two similar baffles 3a and is flared at 7a where it receives the diffusors 5a. The upward current created by the air introduced at 5a maintains a gradient from the middle toward each side of the tank. Consequently the upward current divides into two horizontal currents flowing in opposite directions. Otherwise the operation is the same as that before described.

Figs. 5 and 6 show the application of the invention to a circular tank. In this case the upflow channel 34 is formed by a vertical pipe 33 supported on feet 35 so that its lower end lies just above the center of the inverted-cone-shaped floor. A diffusor 36 is suspended on an air pipe 37 so that it is positioned in the upper end of channel 34 near the surface of the liquor. The sewage flows into the tank from influent weir-channel 38 and overflows at 39 into effluent weir-channel 40. Air introduced through diffusor 36 establishes an upward current in channel 34 which maintains a gradient from the center of the tank toward all sides. The flow is therefore outward in all directions from the center, downward along all sides, and inward along the bottom.

The final settling tank shown only in Fig. 1 is also used in combination with the other forms of the invention shown in the other figures. The deflectors 8 and 11 of Fig. 3 can also be used, with suitable adaptations, in the aeration tanks shown in Figs. 4 to 6.

The distinguishing feature of all of the illustrations of the invention described is that by a suitable arrangement of baffles in combination with elevated diffusors the whole body of sewage is kept in active circulation with a minimum expenditure of power.

This application is a continuation-in-part of my prior applications, Serial Nos. 360,896, filed May 6, 1929, and 114,537, filed June 8, 1926.

Having described my invention, I claim,

1. In a sewage treatment plant, an aeration tank; an influent channel leading into said tank; a vertical baffle in said tank forming a narrow upflow channel and extending in the direction of flow from inlet to outlet of the tank, said baffle terminating at its top at a short distance below the surface of the sewage and at its bottom at a short distance above the bottom of said tank; means for introducing air into said upflow channel at a substantial distance above the bottom of said tank, to cause the sewage to flow upward in said upflow channel and to thereby set the whole body of sewage in said tank in circulation; a final settling tank; effluent means to permit aerated sewage to flow from said aeration tank into said final settling tank; and means for returning sludge from said settling tank to said aeration tank.

2. In a sewage treatment plant, an aeration tank; an influent channel leading into one end of said tank; effluent means at the other end of said tank; vertical baffle means running the whole length of said tank and forming a narrow upflow channel, the upper edge of said baffle means being a short distance below the surface of the sewage and the bottom edge thereof a short distance above the bottom of said tank; means for introducing air into said upflow channel at a substantial distance above the bottom of said tank, to cause the sewage to flow upward in said upflow channel and to thereby set the whole body of sewage in said tank in circulation; a final settling tank into which sewage is discharged from said effluent means; and means for returning sludge from said settling tank to said aeration tank.

3. In a sewage treatment plant, an aeration tank; an influent channel leading into one end of said tank; effluent means at the other end of said tank; a vertical baffle running the whole length of said tank near one side to form a narrow upflow channel, the upper edge of said baffle being a short distance below the surface of the sewage and the bottom edge thereof a short distance above the bottom of said tank; means for introducing air into said upflow channel at a substantial distance above the bottom of said tank, to cause the sewage to flow upward in said upflow channel and to thereby set the whole body of sewage in said tank in circulation; a final settling tank into which sewage is discharged from said effluent means; and means for returning sludge from said settling tank to said aeration tank.

4. In a sewage treatment plant, an aeration tank; an influent channel leading into one end of said tank; effluent means at the other end of said tank; vertical baffle means running the whole length of said tank and forming a narrow upflow channel, the upper edge of said baffle means being a short distance below the surface of the sewage and the bottom edge thereof a short distance above the bottom of said tank; an oblique deflector above said upflow channel; means for introducing air into said upflow channel at a substantial distance above the bottom of said tank, to cause the sewage to flow upward in said upflow channel and to thereby set the whole body of sewage in said tank in circulation; a final settling tank into which sewage is discharged from said effluent means; and means for returning sludge from said settling tank to said aeration tank.

5. In a sewage treatment plant, an aeration tank; an influent channel leading into one end of said tank; effluent means at the other end of said tank; vertical baffle means running the whole length of said tank and forming a narrow upflow channel, the upper edge of said baffle means being a short distance below the surface of the sewage and the bottom edge thereof a short distance above the bottom of said tank; means for introducing air into said upflow channel at a substantial distance above the bottom of said tank, to cause the sewage to flow upward in said upflow channel and to thereby set the whole body of sewage in said tank in circulation; a final settling tank into which sewage is discharged from said effluent means; and means for returning sludge from said settling tank to said aeration tank at a point removed a substantial distance from the influent end of the tank.

6. A sewage treatment tank, an inlet and an outlet for sewage, a vertically disposed baffle near one wall above the bottom of the tank and below the liquid level extending in the general direction of flow from inlet to outlet, and means for letting in air under pressure between the baffle and the adjacent wall and between the inlet and the outlet.

7. A sewage treatment tank, an inlet and an outlet for sewage, a baffle near one wall of the tank above the bottom of the tank and below the liquid level and extending substantially the entire length of the wall in the general direction of flow from inlet to outlet, and means above the bottom of the baffle for letting air under pressure into the space between the baffle and the wall for keeping the tank contents moving.

8. A sewage treatment tank, an inlet and an outlet for sewage, a pair of contiguous baffles above the bottom and below the liquid level extending in the general direction of flow from inlet to outlet, and means for admitting air under pressure between the baffles to cause liquid to flow upward between the baffles.

HENRY E. ELROD.